US010294675B2

(12) United States Patent
Langeveld

(10) Patent No.: US 10,294,675 B2
(45) Date of Patent: May 21, 2019

(54) BRACKET FOR MOUNTING A PANEL TO A CARRIER

(71) Applicant: Hunter Douglas Industries BV, Rotterdam (NL)

(72) Inventor: Michiel J. J. Langeveld, Zoetermeer (NL)

(73) Assignee: Hunter Douglas Industries B.V., Rotterdam (NL)

( * ) Notice: Subject to any disclaimer, the term of this patent is extended or adjusted under 35 U.S.C. 154(b) by 0 days.

(21) Appl. No.: 15/807,744

(22) Filed: Nov. 9, 2017

(65) Prior Publication Data
US 2018/0127984 A1    May 10, 2018

(30) Foreign Application Priority Data

Nov. 10, 2016 (EP) ..................................... 16198148

(51) Int. Cl.
*E04F 13/08* (2006.01)
*E04B 1/41* (2006.01)
(Continued)

(52) U.S. Cl.
CPC .............. *E04F 13/083* (2013.01); *E04B 1/40* (2013.01); *E04B 9/366* (2013.01); *F16B 5/0685* (2013.01);
(Continued)

(58) Field of Classification Search
CPC ...... E04F 13/083; F16B 5/0685; F16B 5/121; F16B 5/125; E04B 1/40; E04B 2001/405;
(Continued)

(56) References Cited

U.S. PATENT DOCUMENTS 1,778,344 A * 10/1930 Venzie ...................... E04B 9/22
52/250
2,720,289 A * 10/1955 Henrickson ............... E04B 5/10
16/87.2
(Continued)

FOREIGN PATENT DOCUMENTS

DE          9310494        9/1993
DE          29612593       10/1996
(Continued)

OTHER PUBLICATIONS

European Patent Office EP Application No. 17200567.0-1005, dated Mar. 22, 2018 (7 pages).

*Primary Examiner* — Joshua K Ihezie
(74) *Attorney, Agent, or Firm* — Dority & Manning, P.A.

(57) ABSTRACT

A bracket for mounting panels to a carrier, the bracket comprising a base and two flanges extending away from the base, the base being located between the two flanges, each flange having an inwardly-facing surface and an outwardly-facing surface bounded by two side edges and a distal end, and wherein each flange comprises at least one outwardly protruding tab for engaging the carrier and thereby securing the bracket to the carrier, and wherein each flange further comprises a pair of slots for receiving a panel, each slot of said pair of slots extending from a different side edge of the flange at a location further away from the base than the outwardly protruding tab. A carrier and bracket assembly and a carrier, bracket and panel assembly are also provided.

24 Claims, 16 Drawing Sheets

(51) Int. Cl.
  *F16B 5/06*       (2006.01)
  *F16B 5/12*       (2006.01)
  *F16M 13/02*      (2006.01)
  *E04B 9/36*       (2006.01)
  *E04B 1/38*           (2006.01)
  *E04B 9/16*           (2006.01)
  *E04B 9/18*           (2006.01)

(52) U.S. Cl.
  CPC .............. *F16B 5/121* (2013.01); *F16B 5/125* (2013.01); *F16M 13/022* (2013.01); *E04B 9/16* (2013.01); *E04B 9/183* (2013.01); *E04B 2001/405* (2013.01)

(58) Field of Classification Search
  CPC ............ E04B 9/366; E04B 9/183; E04B 9/16; F16M 13/022
  USPC .................... 52/506.06, 506.08, 506.09, 512
  See application file for complete search history.

(56) References Cited

U.S. PATENT DOCUMENTS

| | | | | |
|---|---|---|---|---|
| 2,866,233 A * | 12/1958 | Lydard | ...................... | E04B 9/16 403/387 |
| 2,920,357 A * | 1/1960 | Ericson | ...................... | E04B 9/02 454/185 |
| 3,131,447 A * | 5/1964 | Tinnerman | ................ | F16L 3/24 248/228.7 |
| 3,678,641 A * | 7/1972 | Englund | ................... | E04B 9/26 52/506.08 |
| 3,708,941 A * | 1/1973 | Cuckson | ................ | E04B 9/065 52/506.08 |
| 4,047,348 A * | 9/1977 | McSweeney | ........... | E04B 9/127 403/178 |
| 4,309,858 A * | 1/1982 | Anderle | .................... | E04B 9/36 52/506.08 |
| 4,364,215 A * | 12/1982 | Gailey | .................... | E04B 9/065 403/347 |
| 4,426,822 A * | 1/1984 | Gailey | .................... | E04B 9/366 52/506.06 |
| 4,516,296 A * | 5/1985 | Sherman | ................... | F16L 3/24 24/20 LS |
| 4,614,072 A * | 9/1986 | Price | ......................... | E04B 9/10 411/433 |
| 4,646,506 A * | 3/1987 | Slapsys | ................... | E04B 9/363 52/460 |
| 4,827,687 A * | 5/1989 | Frawley | ................... | E04B 9/10 52/473 |
| 5,115,611 A * | 5/1992 | Lim | ......................... | E04B 9/36 52/222 |
| 5,195,289 A * | 3/1993 | LaLonde | ................... | E04B 9/30 52/506.06 |
| 5,393,021 A * | 2/1995 | Nelson | .................... | F16L 3/127 248/71 |
| 5,984,243 A * | 11/1999 | Pfaller | ................... | F16L 3/1066 248/74.1 |
| 6,434,908 B1 * | 8/2002 | Ferrante | .................... | E04B 2/82 52/481.2 |
| 6,494,415 B1 * | 12/2002 | Roth | ......................... | F16L 3/24 248/62 |
| 7,090,174 B2 * | 8/2006 | Korczak | ............... | F16B 21/075 248/58 |
| 10,060,460 B1 * | 8/2018 | Winn | .................... | F16B 7/0473 |
| 2010/0199594 A1* | 8/2010 | Wendt | .................... | E04B 9/006 52/718.04 |
| 2015/0059279 A1* | 3/2015 | Harper | .................... | E04B 9/001 52/506.06 |
| 2016/0281881 A1* | 9/2016 | Vaccaro | ................... | F16B 1/00 |
| 2017/0284104 A1* | 10/2017 | Hatzinikolas | ....... | E04F 13/0801 |

FOREIGN PATENT DOCUMENTS

| | | |
|---|---|---|
| DE | 20107617 | 10/2001 |
| FR | 2590304 | 5/1987 |
| FR | 2683566 | 5/1993 |

\* cited by examiner

BRACKET FOR MOUNTING A PANEL TO A CARRIER

CROSS-REFERENCE TO RELATED APPLICATIONS

This application is based upon and claims priority to EP Application No. 16198148.5, filed on Nov. 10, 2016, the disclosure of which is hereby incorporated by reference herein in its entirety for all purposes.

TECHNICAL FIELD

The present disclosure relates to brackets for mounting panels to carriers attached to or suspended from walls or ceilings.

BACKGROUND ART

Wall and ceiling panels formed from various materials such as wood or metals such as aluminium, for example, are known in the art. Such panels may be, for example, square or rectangular in shape when installed and viewed from below (in the case of a ceiling panel) or from the front of the panel (in the case of a wall panel), or may instead be of a linear form. Linear panels have a length which is substantially greater than their width, the length generally being at least three times and more usually at least five times the width of the panel.

Carriers for mounting panels are known in the art. Where a ceiling is to be paneled, the carriers are attached to or are suspended from the structural ceiling or upper part of a wall adjacent to the structural ceiling. The ceiling panel is attached to the carrier, and is thereby mounted on the ceiling. In the case of a wall, the carriers are attached to or are spaced from the wall, and the wall panels are attached to the carriers.

The panels may be attached directly to the carriers, or alternatively a bracket may be attached to the carrier and the panel may be attached to the bracket. Brackets may advantageously be used where it is desirable that flexibility be provided with regard to where the panel is installed on the carrier.

DE7440299 discloses a bracket for mounting ceiling panels. FIG. 1 shows a prior art assembly including a carrier, a ceiling panel and a bracket in accordance with the teaching of DE7440299. A carrier 2 is provided with a bracket 1 having a base 5 and two flanges 8 which extend from the base 5. The bracket is placed over the carrier 2 at the desired position and is secured to the carrier with snap locks 4. The base 5 of the bracket 1 and the corresponding part of the carrier 2 are provided with holes 6, 7 which permit the bracket to be fixed to the carrier by aligning the holes 6 in the base of the bracket with the holes 7 in the carrier and then screwing the bracket and the carrier together. The flanges 8 of the bracket have cut-out portions for receiving the edges of a ceiling panel 3.

However, there are various limitations imposed by the arrangement taught in DE7440299. For example, depending on the method used to attach the carrier to the ceiling, the bracket may not able to be fitted at a location where the carrier is attached to the ceiling, thereby limiting the positions at which the panel may be fixed to the carrier. Additionally, the brackets either need to be positioned on the carrier prior to attaching the carrier to the ceiling or alternatively enough space needs to be provided around the carrier to permit the brackets to be attached to the carrier once the carrier has been attached to the ceiling. Furthermore, the brackets are not easily moveable once they have been screwed into position on the carrier.

SUMMARY

This summary of the disclosure is not intended to identify key features or essential features of the claimed subject matter, nor is it intended as an aid in determining the scope of the claimed subject matter.

Disclosed herein is an improved bracket for mounting panels to a carrier, which alleviates or at least reduces the aforementioned drawbacks. Such drawbacks may be alleviated or reduced by a bracket for mounting panels to a carrier, the bracket comprising a base and two flanges extending away from the base, the base being located between the two flanges, and wherein each flange comprises at least one outwardly protruding tab for engaging an inner surface of the carrier and thereby securing the bracket to the carrier. Each flange of the bracket may have an inwardly-facing surface and an outwardly-facing surface bounded by two side edges and a distal end.

The carrier may have a substantially U-shaped cross-section with a base and two side walls extending away from the base. During installation of the bracket in the carrier, the outwardly protruding tab engages with an inner surface of the carrier thereby securing the bracket within the carrier. This inner surface of the carrier may for example be the side wall of the carrier. Thus, the bracket is located within the carrier rather than around the outside of the carrier. This permits the bracket, and therefore the panel, to be attached at any position along the carrier, regardless of the position at which the carrier is attached to the wall or ceiling. There is also no need to provide additional space around the top of the carrier if the bracket is to be attached to the carrier after the carrier has been attached to the wall or ceiling, as the bracket is not fixed around the outside of the carrier and does not need to be screwed to the carrier.

BRIEF DESCRIPTION OF THE DRAWINGS

Further features, aspects, and advantages of the present disclosure will also become apparent from the following detailed description of embodiments, when read in conjunction with the exemplary drawings in which:

FIG. 2c shows an end view of the bracket of FIG. 2a.

FIG. 2d shows a side view of the bracket of FIG. 2a.

FIG. 3b shows a side view of the bracket of FIG. 3a.

FIG. 3c shows an end view of the bracket of FIG. 3a.

FIG. 4b shows a side view of the bracket of FIG. 4a.

FIG. 4c shows an end view of the bracket of FIG. 4a.

FIG. 5b shows a side view of the bracket of FIG. 5a.

FIG. 8b shows a side view of the bracket, carrier and panel assembly of FIG. 8a.

FIG. 10b shows an end view of the bracket of FIG. 10a.

FIG. 12b shows an end view of the bracket and carrier assembly of FIG. 12a.

FIG. 12c shows an isometric view of the bracket and carrier assembly of FIG. 12a.

FIG. 14b shows an isometric view of the bracket and carrier assembly of FIG. 14a.

Figure 1:
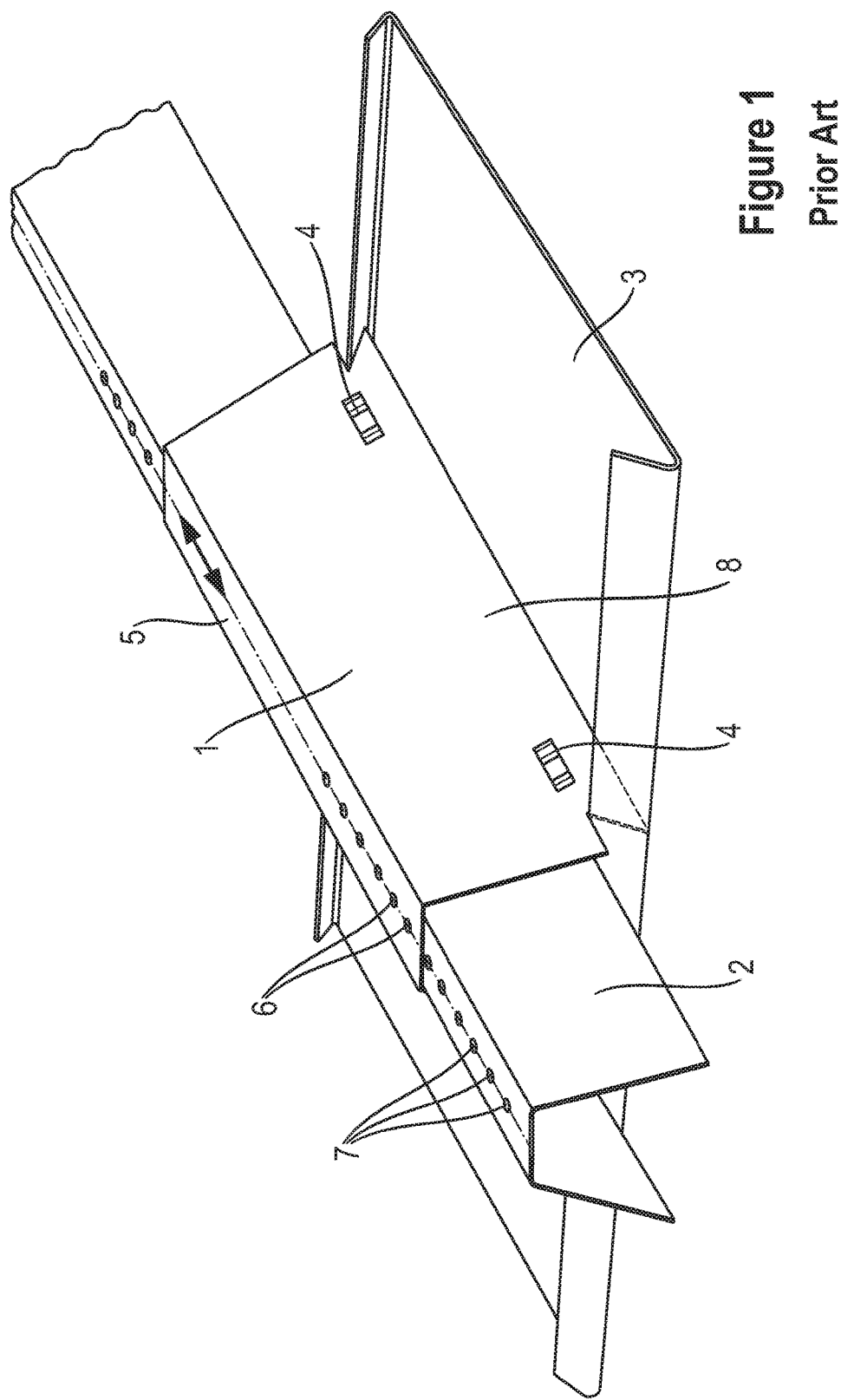
FIG. 1 shows an isometric view of a prior art mounting assembly including a carrier, a ceiling panel and a bracket.

The accompanying drawings are provided for purposes of illustration only, and the dimensions, positions, order, and relative sizes reflected in the drawings attached hereto may vary. The detailed description will be better understood in conjunction with the accompanying drawings. Reference now will be made in detail to embodiments of the present subject matter, one or more examples of which are illustrated in the drawings. Each example is provided by way of explanation of the present subject matter, not limitation of the present subject matter. In fact, it will be apparent to those skilled in the art that various modifications and variations can be made in the present disclosure without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the appended claims and their equivalents.

Even though two or more figures illustrating different embodiments may have such elements that are structurally and/or functionally similar, the presence of a same reference sign or number in otherwise different embodiments should not be understood as limiting the disclosure to the specific element nor the scope of protection of the claimed subject-matter.

DETAILED DESCRIPTION

The afore-mentioned and other features and advantages of the present disclosure will be readily apparent from the following detailed description, the scope of the disclosure being set out in the appended claims.

According to an embodiment, the bracket may further comprise one or more slots for receiving a panel. Each flange may comprise a pair of slots for receiving a panel, each slot of said pair of slots extending from opposite side edges of the flange at a location further away from the base than the outwardly protruding tab.

The slots may each receive an edge of a panel. The term slot is used to describe a profiled portion of the edge of the flange, including at least a support surface to provide support to a portion of a ceiling panel, e.g. a surface extending in the direction of the opposite edge of the flange, preferably in the direction of the orientation of the panel. E.g. for a horizontally extending panel the support surface may also extend horizontally, for a ceiling panel oriented at an angle, the support surface may include an angle which provides the desired support. The support surface may also be contoured to accommodate an edge of the ceiling panel. A slot may be an incision, or cutout, including two parallel spaced apart surfaces, the lower one of which to provide support to the ceiling panel. By providing the slots on the side edges of the flanges, the panel covers the distal end of the flanges and also the side edges between the distal end and the slots. This hides the bracket from view. Furthermore, where it is desired that panels be placed adjacent to each other without leaving a visible gap, this is possible as the brackets can be placed adjacent to each other on the carrier with the result that the sides of the panels touch each other.

In an embodiment, the slots are located closer to the distal end of the flange than the outwardly protruding tab, so that the installation of the bracket in the carrier does not affect, and is not affected by, the mounting of the panel to the bracket.

Sometimes it is desirable to space the panel downwardly from the ceiling, or away from a wall, for example, to allow cables, lighting, air ducts, etc. to be located in the space between the wall or ceiling and the panel. This may be achieved by suspending the carrier away from the ceiling or spacing the carrier from the wall, and/or the bracket may be used to achieve spacing of the panel from the carrier. In this case, the distance along the flange between the slots and the outwardly protruding tab can be maximized.

Advantageously, the bracket is made from a single metal blank, such that it is formed integrally from the same material. Preferably the bracket is made from a resilient material which is able to be flexed, such as sheet metal, for example. Alternatively the bracket may be made from two different materials, a resilient material being used for the flanges at least. Where the flanges or the whole bracket is formed from a resilient material, the bracket may be inserted in the carrier by pressing the flanges towards each other and inserting the base of the bracket in the carrier at the same time. This allows the bracket to be inserted at any position into the carrier, without the need to bend the side walls of the carrier or to insert the bracket from an end of the carrier. Once the flanges are released, they will move back to their original position spaced from each other, thereby causing the outwardly protruding tabs to engage the inner surfaces of the side walls of the carrier.

The bracket may comprise one or more outwardly protruding tabs per flange. For example, each flange may comprise a single outwardly protruding tab located roughly centrally between the side edges of the flange. Alternatively, each flange may comprise two outwardly protruding tabs, one located at each side edge of the flange. The outwardly protruding tabs may be formed by providing a slot or cut out in the flange and bending the adjacent part of the flange outwardly.

One single slot or cut out may be provided on each of the side edges of each flange for both forming the tab and for receiving the panel. Alternatively, two different slots or cut outs may be provided on each of the side edges of each flange for forming a tab and receiving a panel, respectively.

Preferably, the tabs have sharp edges for allowing the tab to securely engage the side wall of the carrier.

The distal end of the flange and/or the part of the flange adjacent to the slot and located towards the distal end of the flange may have a curved shape in order to facilitate the mounting of the panel in the slot.

The base may have an inner surface located between the inwardly-facing surfaces of the flanges and an outer surface on the opposite side of the base, the outer surface being located adjacent the carrier when the bracket is installed in a carrier. The outer surface of the base may comprise one or more indexing features such as protrusions. The one or more protrusions may be configured to fit into corresponding through holes, blind holes or recesses in the carrier. This may aid with positioning the bracket in the carrier. The protrusions may include a through hole extending through the base of the bracket and through the protrusion. Alternatively, these indexing features may be provided on the carrier, or on both the carrier and the bracket. These indexing features may be provided at regular or irregular intervals, or according to a specified pattern. However, it should be clear that these indexing features are optional, and that the bracket and carrier can both be provided without indexing features. This allows the bracket to be positioned freely inside the carrier at any position.

The flanges may extend substantially perpendicular to the base of the bracket. Alternatively, the flanges may extend at an angle greater than 90 degrees away from the inner surface of the base, such as 90-130 degrees for example, so that the flanges no longer extend in a parallel direction to each other but instead extend away from each other.

The brackets may have a substantially U or V shape in cross section.

In an embodiment, the bracket may further comprise a rotatable element, the rotatable element being rotatably coupled to the base and/or at least one of the flanges. The rotatable element may comprise one or more slots for receiving a panel. Where slots are provided on the rotatable element, the flanges of the bracket may not be provided with slots. The slots provided on the rotatable element may be similar to the slots previously described. The rotatable element may be coupled by a swivel to the base of the bracket such that the rotatable element is able to rotate freely with respect to the base of the bracket. The rotatable element may rotate around an axis perpendicular to the base of the bracket. This permits the bracket to be held firmly in a carrier whilst the rotatable element of the bracket permits a panel held by the bracket to be aligned at various angles with respect to the carrier. The swivel may be, for example, a bolt and nut.

The rotatable element may comprise a base portion and two flange portions extending away from the base portion, the base portion being located between the two flange portions. The base portion of the rotatable element may be rotatably coupled to the base of the bracket, for example by a swivel. Each flange portion of the rotatable element may comprise at least one slot for receiving a panel. The distal end of a flange portion and/or the part of a flange portion adjacent to a slot and located towards the distal end of the flange portion may have a curved shape in order to facilitate the mounting of a panel in the slot.

The rotatable element may be made from a single metal blank, such that it is formed integrally from the same material.

In embodiments where the bracket is provided with a rotatable element, the bracket may be inserted in the carrier by pressing the flanges towards each other and inserting the flanges of the bracket in the carrier at the same time. This allows the bracket to be inserted at any position into the carrier, without the need to bend the side walls of the carrier or to insert the bracket from an end of the carrier. Once the flanges are released, they will move back to their original position spaced from each other, thereby causing the outwardly protruding tabs to engage the inner surfaces of the side walls of the carrier thereby holding the bracket in position with respect to the carrier. The base of the bracket will then protrude from the carrier away from the ceiling or wall. In embodiments, the base of the bracket may be coupled to the rotatable element, which may be able to freely rotate relative to the base of the bracket. The rotatable element may be provided with slots for receiving a panel as described above.

The present disclosure further provides a bracket and carrier assembly, and a bracket, carrier and panel assembly. The carriers may be ceiling or wall carriers, and the panels may be ceiling or wall panels. The panels may be linear panels. Alternatively, the panels may be substantially square panels or rectangular or other shapes.

In an embodiment, the carrier may comprise a carrier base and two side walls which extend in substantially the same direction away from and substantially perpendicular to the carrier base and the tabs of the bracket are each configured to engage with an inner surface of a side wall of the carrier.

In an embodiment, the carrier may comprise a carrier base and two side walls which extend in substantially the same direction away from and substantially perpendicular to the carrier base and wherein a distal end of each of the side walls of the carrier is curved inwardly, and the tabs of the bracket are each configured to engage with a curved side wall or an edge of a curved side wall of the carrier.

Figure 2A:
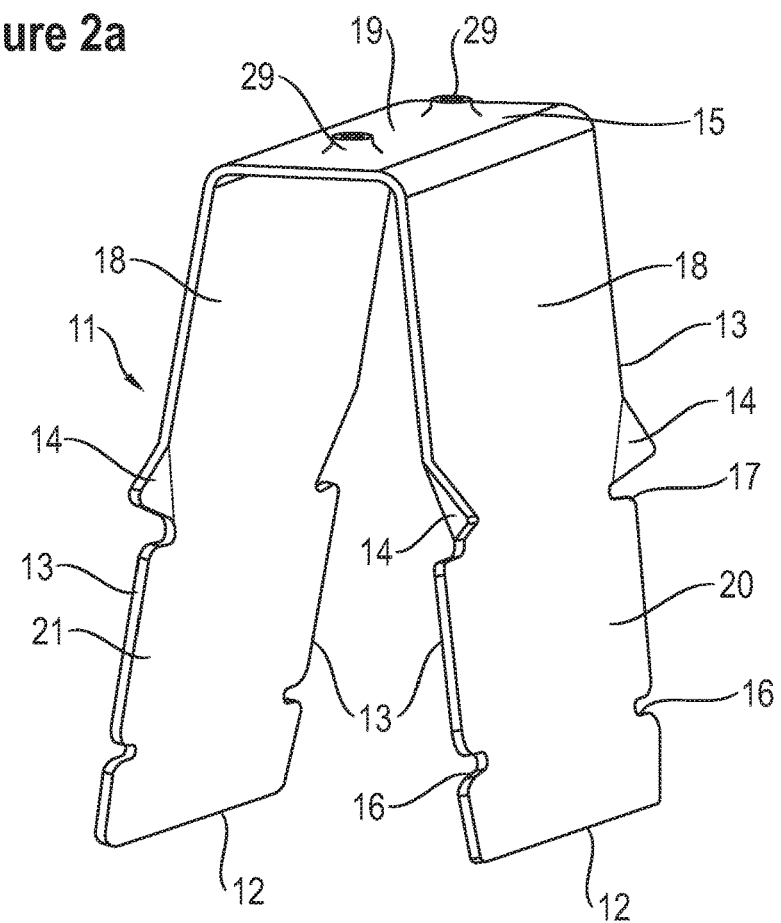
FIG. 2a shows an isometric view of a bracket in accordance with the present disclosure.
Figure 2B:
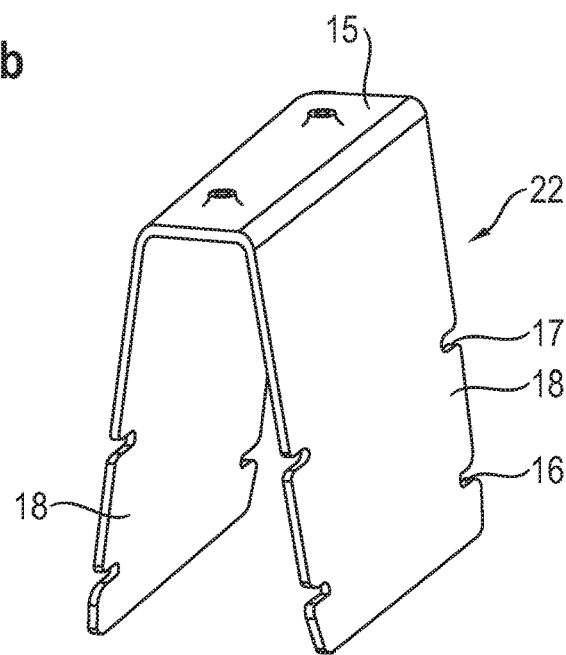
FIG. 2b shows a blank, for example a metal blank, from which the bracket of FIG. 2a may be formed.

A bracket 11 in accordance with an embodiment of the present disclosure is depicted in FIG. 2a. The bracket 11 comprises a base 15 and two side legs or flanges 18 which extend away from the base. The flanges terminate at distal end 12. The flanges 18 and the base 15 are preferably made out of a single piece of material, which may, for example, be a sheet metal. It is preferable that at least the flanges 18 are made from a resilient material such that, on application of a force, the flanges may be pressed inwardly, i.e. towards each other, and may then return to their original position once the force is removed. Each flange 18 has two side edges 13 which extend between the base 15 and the distal end 12 of the flange 18. Each flange 18 comprises two slots 17 which extend from the side edge 13 of the flange 18. Preferably, the slots 17 are located across from each other, one on each side edge 13 of the flange 18, and extend laterally towards each other, as can be seen in FIG. 2b. The part of the flange that extends adjacent to the slot 17 and which is located between the base 15 and slot 17, may then be bent in an outward direction to form an outwardly protruding tab 14 as shown in FIG. 2a. These tabs are configured to engage with the side wall of a carrier to permit the bracket 11 to be mounted in the carrier, as shown in more detail in FIG. 7.

The flanges 18 also each include two slots 16 for receiving a panel to be mounted to the bracket. The slots 16 are located between the tabs 14 and the distal end 12 of the flange 18. Both flanges have an inwardly facing surface 21 and an outwardly facing surface 20.

Figure 2C:
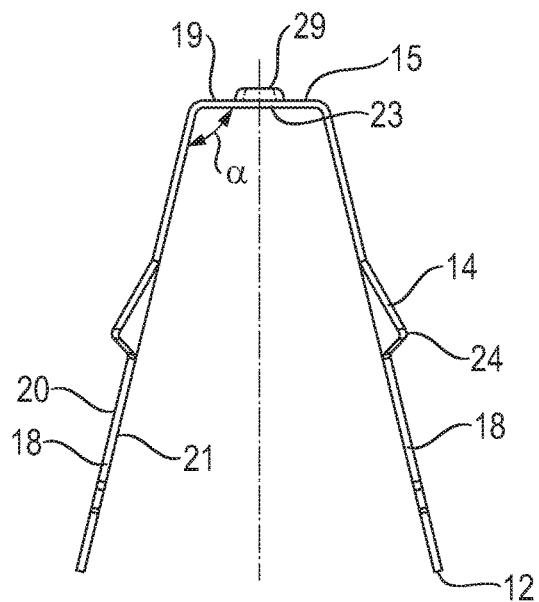

The bracket 11, in this example, further comprises two protrusions 29 located on the outer surface 19 of the base 15. These protrusions 29 are configured to fit into corresponding holes or recesses in the carrier, in order to hinder longitudinal movement of the bracket 11 along the carrier. Although two protrusions 29 are shown in this example, the bracket 11 may comprise just a single protrusion located on the outer surface 19 of the base 15, or alternatively the bracket may comprise three or more protrusions 29 located on the outer surface 19 of the base 15. Alternatively, the bracket may comprise no protrusions 29 at all. Another way of preventing longitudinal movement of the bracket 11 along the carrier is to provide the tabs 14 with a sharpened edge 24 as shown in FIG. 2c. The sharpened edge is configured to dig into the inside surface of the side wall of the carrier, thereby maintaining the bracket in position. The sharpened edges 24 of the tabs 14 are optional, and may be provided whether or not the bracket comprises protrusions 29 located on the outer surface of the base 15.

The bracket 11 of this example has flanges which extend away from the base 15 at an angle α with respect to the inner surface 23 of the base 15 as shown in FIG. 2c. Preferably, the angle α is more than 90°, in order to permit the tabs 14 to fully engage with the carrier when the bracket is installed in the carrier. However, the angle α may alternatively be 90° or less than 90°, particularly in the case where the side walls of the carrier bend inwardly or are provided with an interior lip or ridge for engaging the tab 14. The angle α may advantageously be in the range of 95-105°.

Figure 3A:
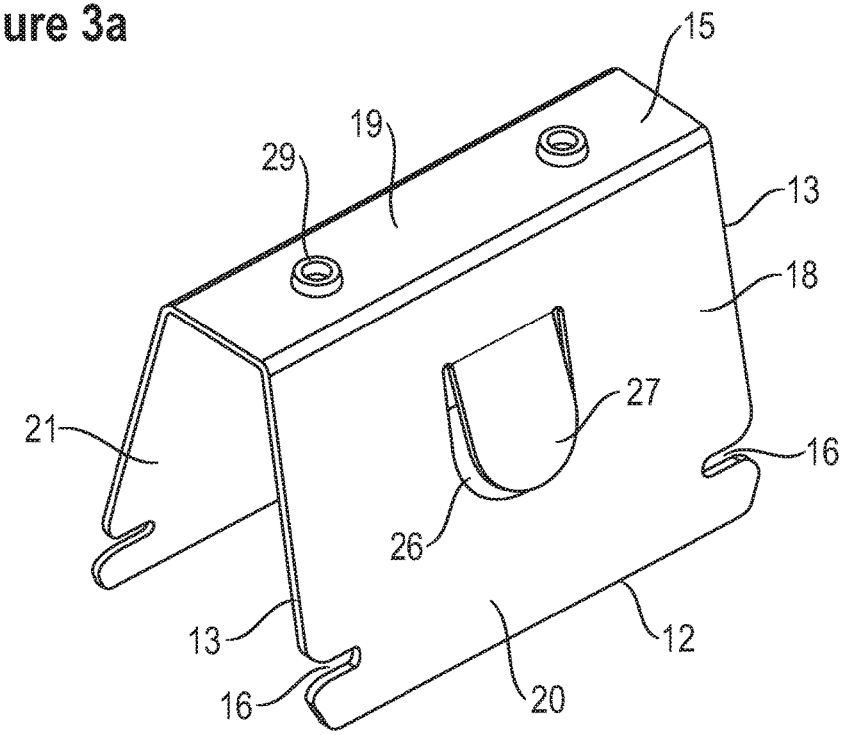
FIG. 3a shows an isometric view of a further bracket in accordance with the present disclosure.

FIG. 3a shows a different bracket in accordance with an embodiment of the present disclosure. However, features which are common to the other brackets described in these examples have the same reference numerals for ease of understanding.

The bracket of FIG. 3a does not have slots 17 and tabs 14 located at the side edges 13 of each flange 18. Instead, each flange 18 of the bracket of FIG. 3a has a single slot 26 formed approximately half-way between the side edges 13 of the flange 18. The slot 26 forms a U-shape, but could alternatively be of a V-shape or a U-shape having right-angled corners, for example. The part of the flange surrounded by the U-shaped slot may be pushed in an outward direction to form an outwardly protruding flap or tab 27. The tab 27 is configured to engage with the carrier in a similar manner to the tabs 14 of the bracket depicted in FIG. 2a. Again, if desired, the edges of the tabs 27 may be sharpened for more secure engagement with the inside surface of the side wall of the carrier. The bracket of FIG. 3a is shown having two protrusions 29 on the outer surface 19 of the base 15, however, as explained above, one or more protrusions may instead be provided, or indeed no protrusions may be provided.

Figure 2D:
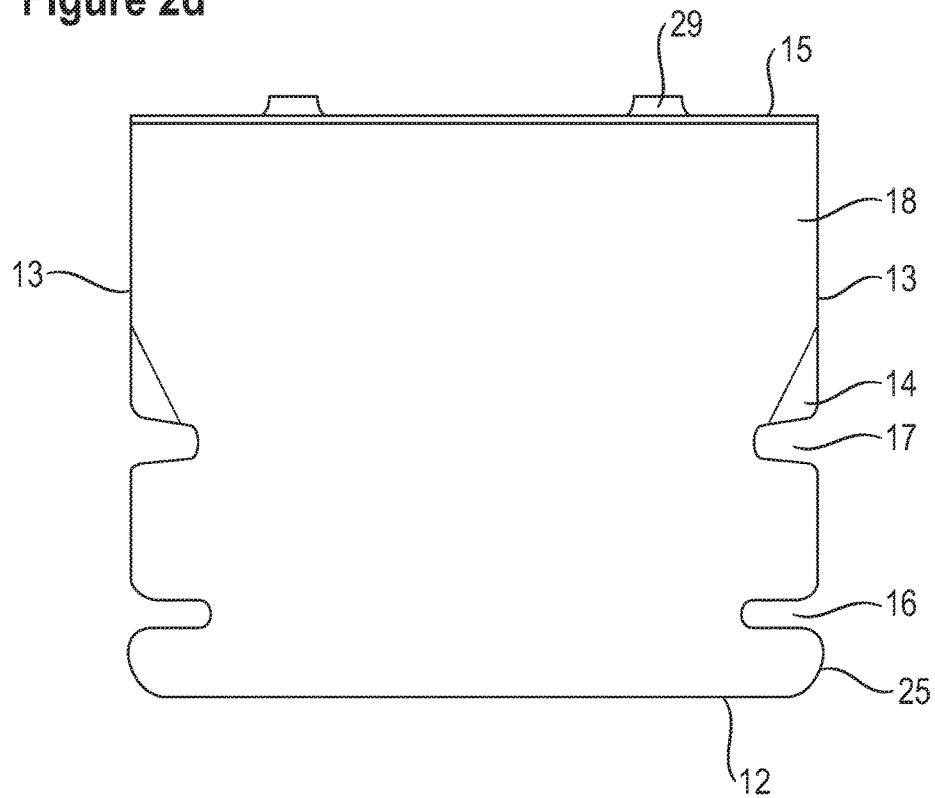
Figure 3B:
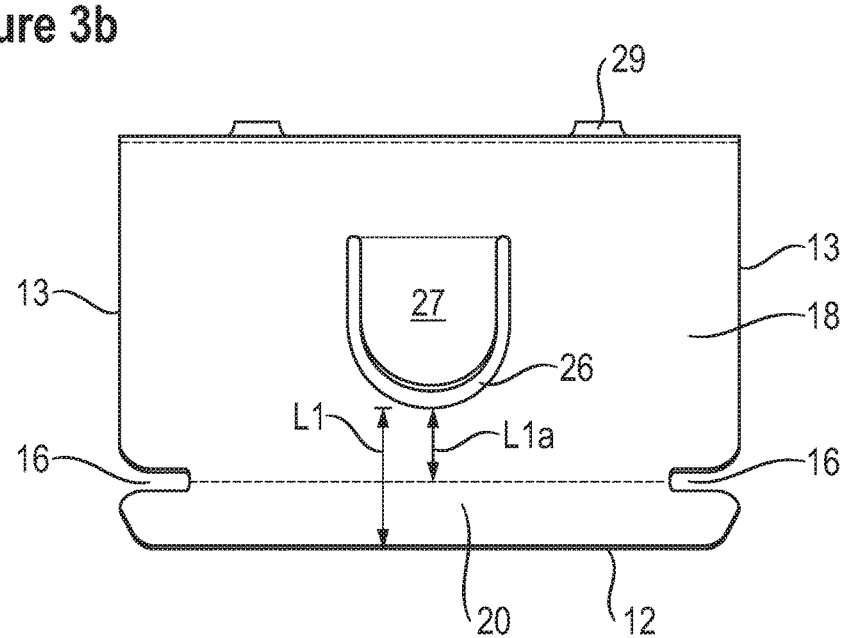
Figure 3C:
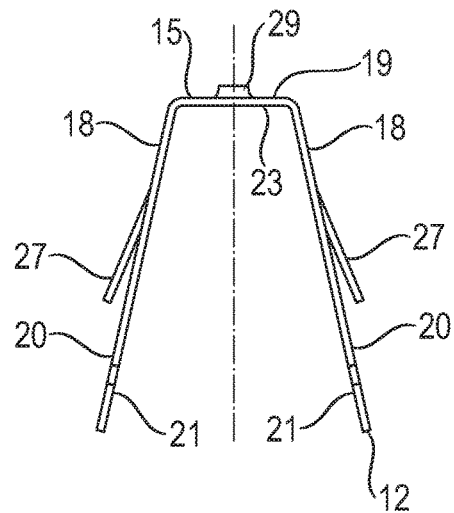
Figure 3D:
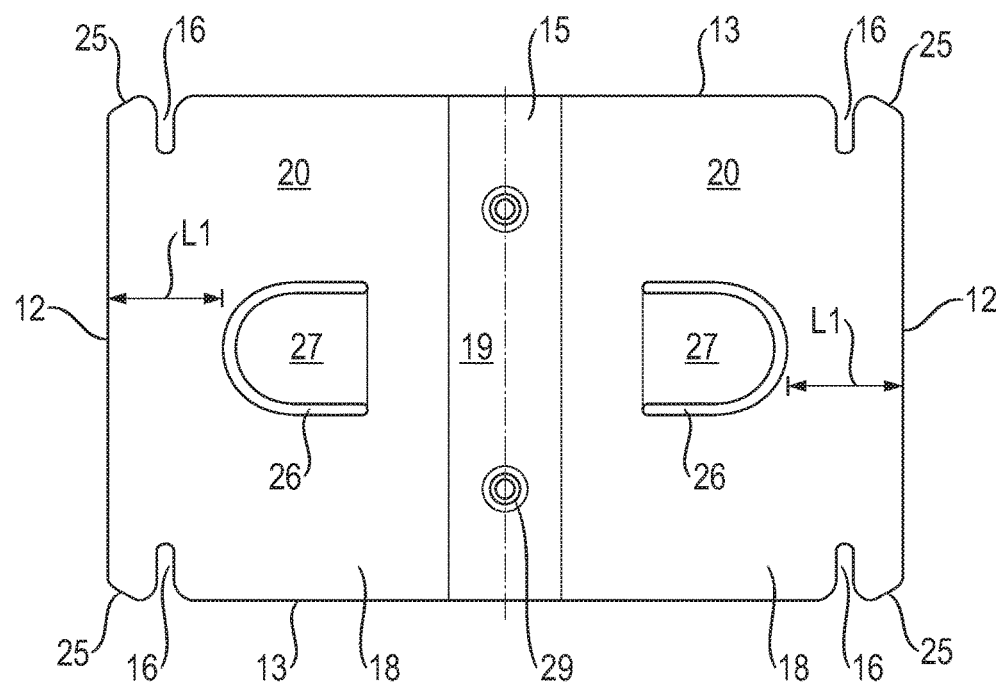
FIG. 3d shows a plan view of a blank from which the bracket of FIG. 3a can be formed.
Figure 8A:
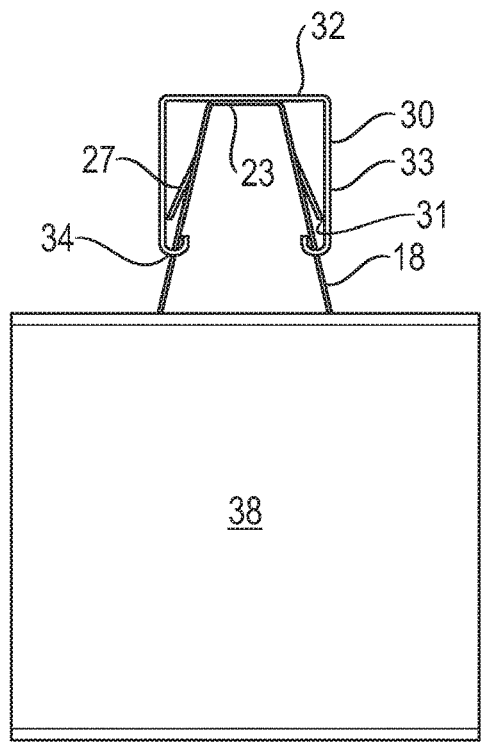
FIG. 8a shows an end view of a further bracket in accordance with the present disclosure being installed in a carrier and having a panel mounted to the bracket.
Figure 8B:
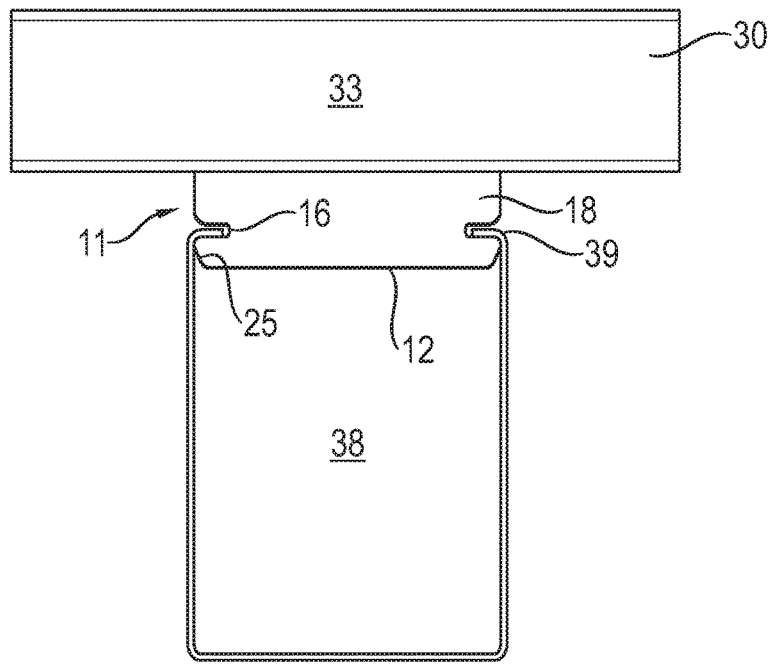
Figure 9:
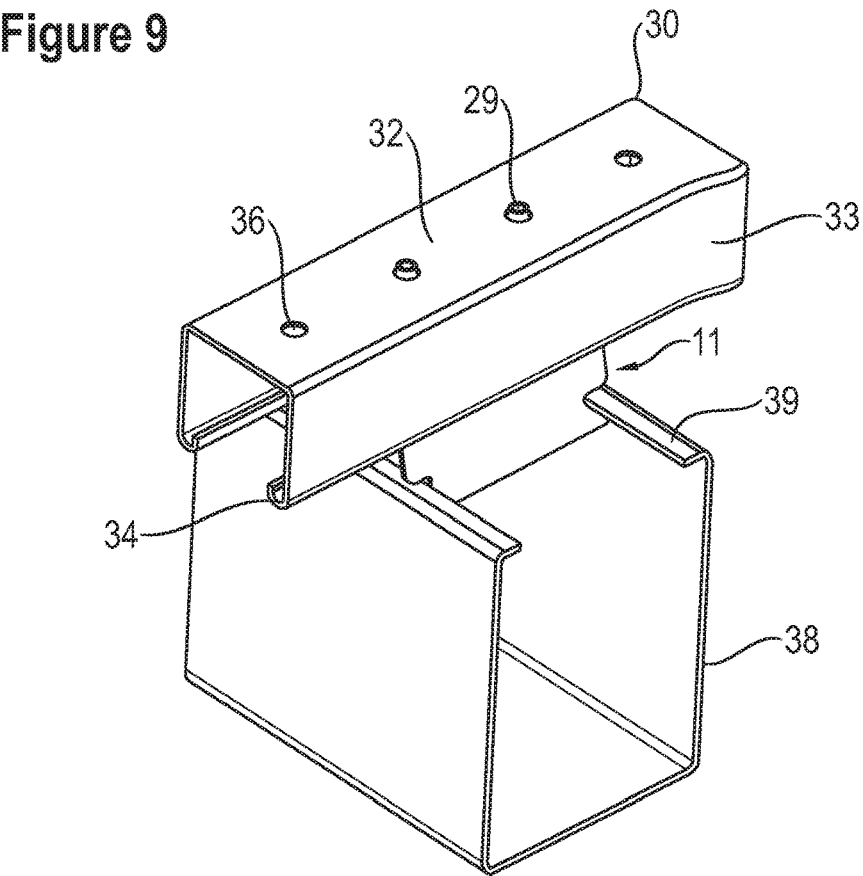
FIG. 9 shows an isometric view of an assembly comprising a bracket in accordance with the present disclosure, the bracket being installed in a carrier, and a panel being mounted to the bracket.

As can be seen in FIGS. 3b and 2d, the distal end of the flanges adjacent to the panel receiving slots 16 is rounded in order to facilitate insertion of a panel edge as shown in FIGS. 8b and 9.

Figure 4A:
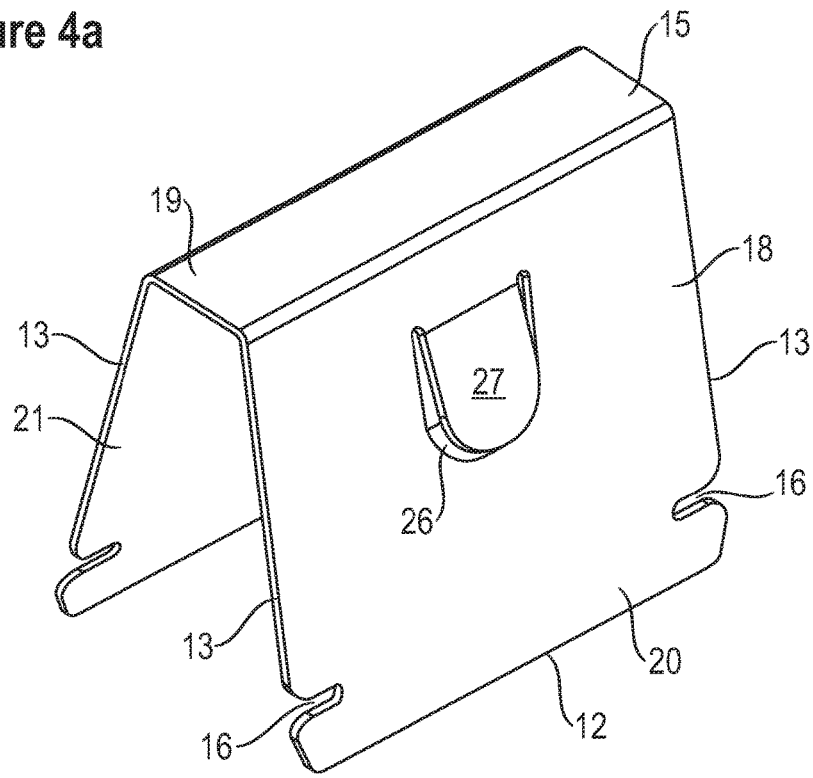
FIG. 4a shows an isometric view of a further bracket in accordance with the present disclosure.
Figure 4B:
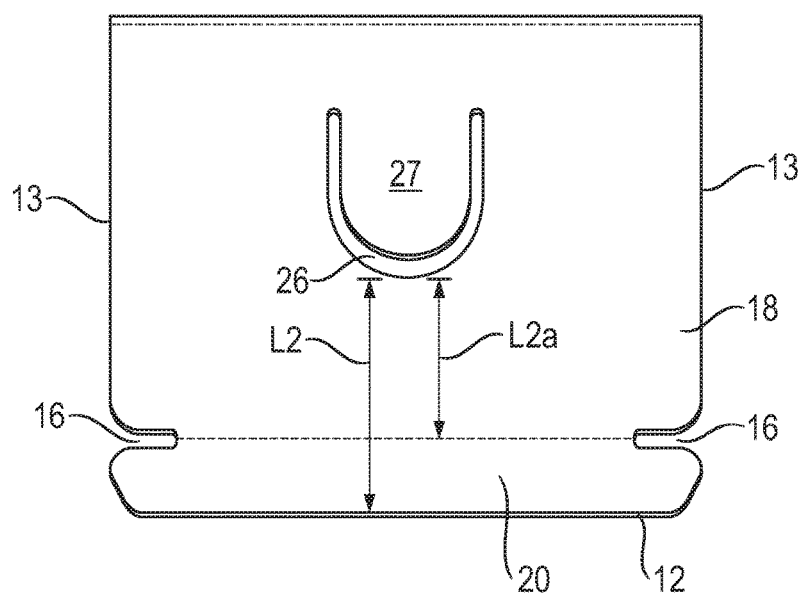
Figure 4C:
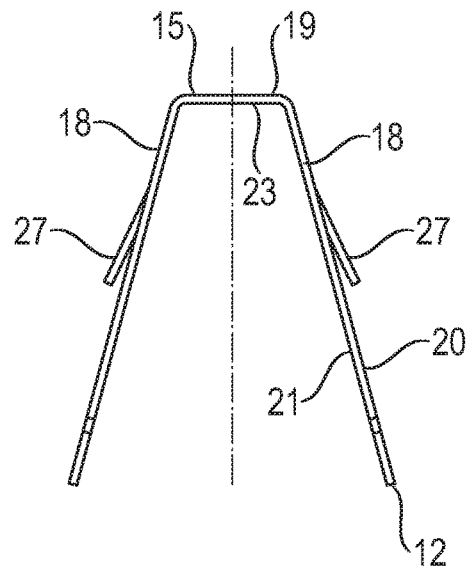
Figure 4D:
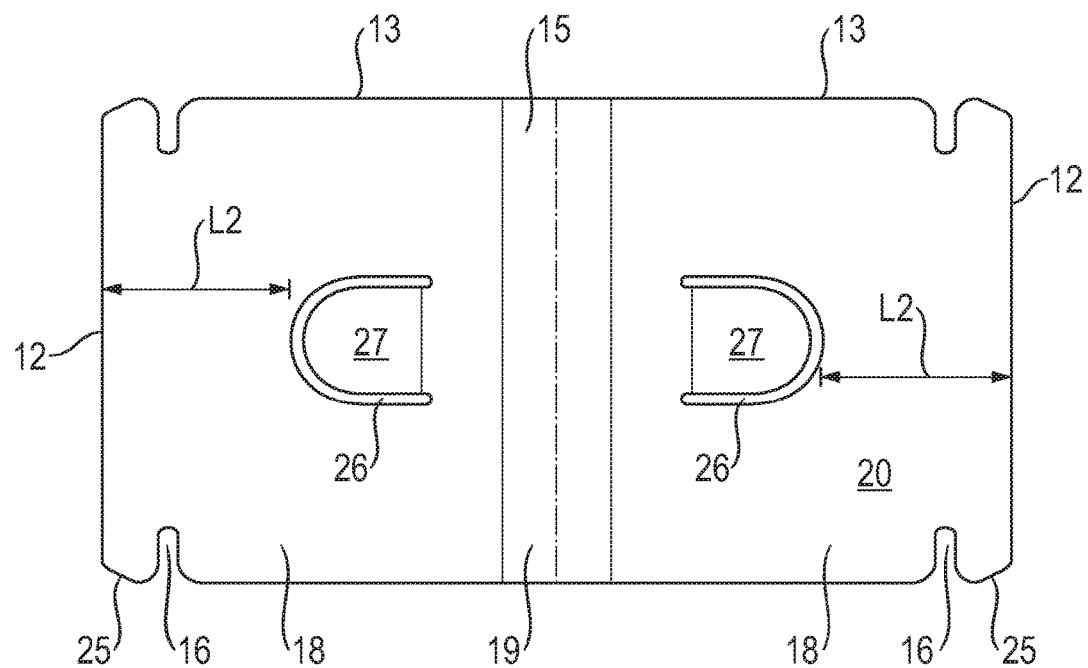
FIG. 4d shows a plan view of a blank from which the bracket of FIG. 4a can be made.

FIG. 4a shows a bracket similar to that depicted in FIG. 3a, but without any protrusions 29 on the outer surface 19 of the base 15 of the bracket. Furthermore, the flanges 18 of the bracket shown in FIG. 4a have a greater distance L2 between the most distal part of the slot 26 and the distal end 12 of the flange. By contrast, the bracket of FIG. 3a has a shorter distance L1 between the most distal part of the slot 26 and the distal end 12 of the flange 18. By providing a greater distance between the slot 26 and the distal end 12 of the bracket (or indeed a greater distance L2a as shown in FIG. 4b than the distance L1a as shown in FIG. 3b), the panel may be suspended at a desired distance away from the carrier. Accordingly, the bracket may be dimensioned such that the panel may be mounted at a position very close to the carrier, or alternatively spaced apart from the carrier, as desired.

The bracket shown in FIG. 2a may also be dimensioned accordingly by increasing or decreasing the distance in a distally extending direction between the slots 17 and 16 as required.

Figure 5A:
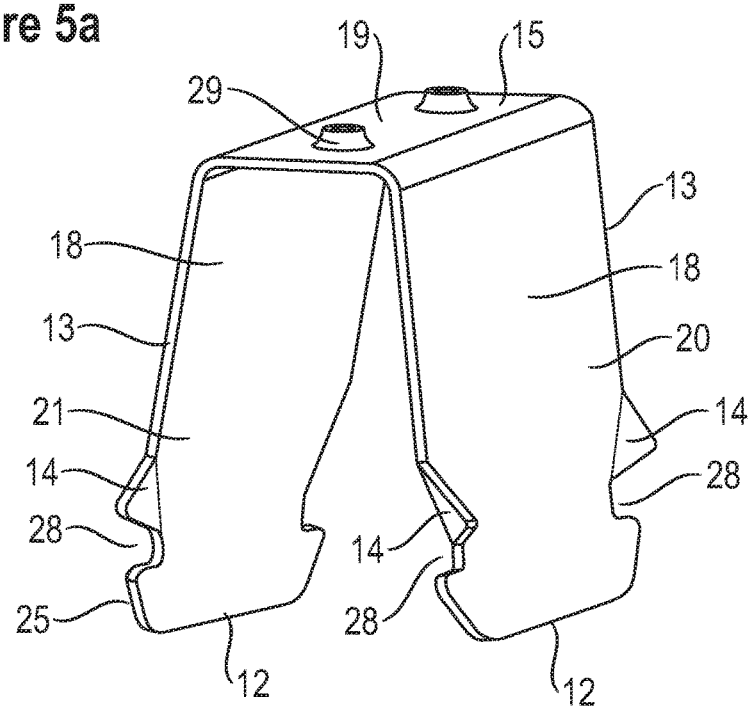
FIG. 5a shows an isometric view of a further bracket in accordance with the present disclosure.
Figure 5B:
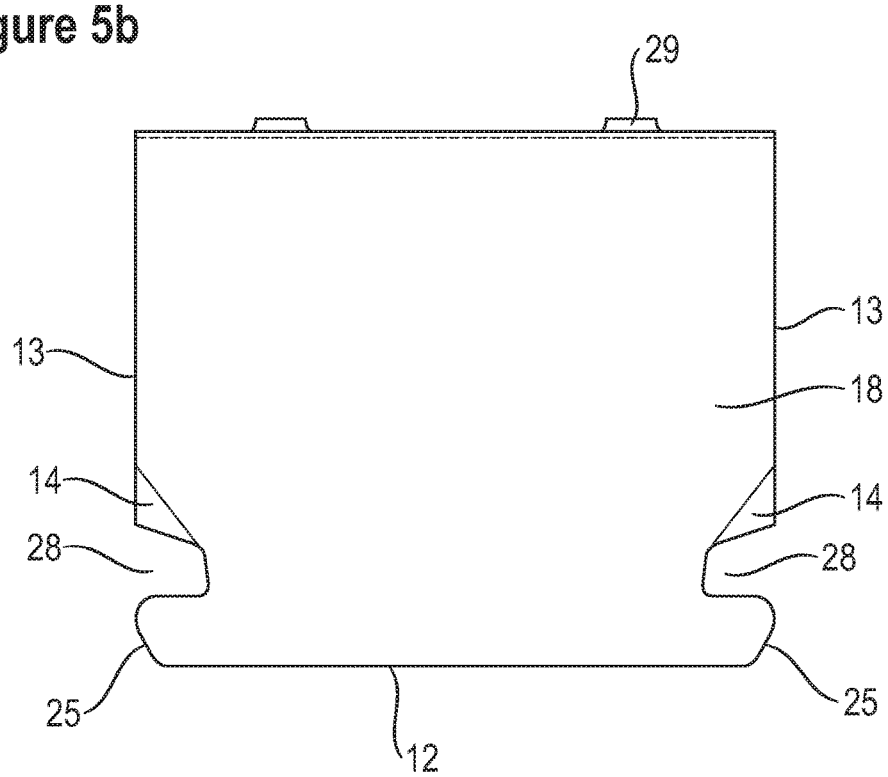

FIG. 5 shows a further bracket in accordance with an embodiment of the present disclosure. This bracket includes tabs 14 as described with reference to FIG. 2a, however, instead of providing, on each side edge of each flange, a slot 17 and a separate slot 16 for receiving a panel, instead, in this example, one single slot 28 is provided. The tabs 14 are formed as described with respect to FIG. 2a above, and a panel is able to be mounted in the same slot 28. The slots 28 may need to be larger in a distally extending direction in order to accommodate the tab 14 inside the carrier, and the panel edge outside the carrier.

Again, although FIG. 5a shows protrusions 29 being located on the outer surface 19 of the base 15, as explained above, these protrusions are optional, and, when included, may comprise one or more protrusions.

Figure 6:
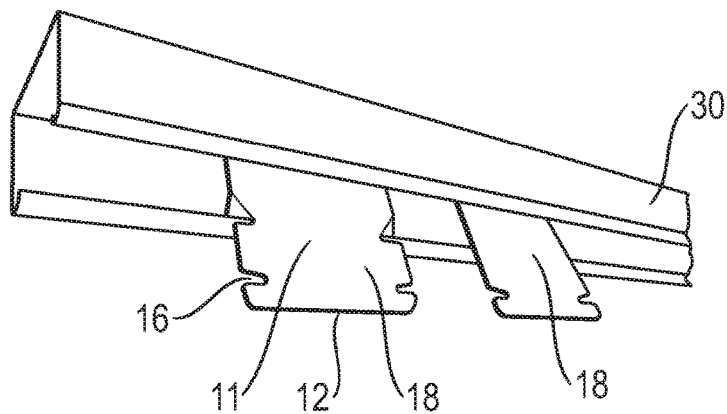
FIG. 6 shows an isometric view of a bracket in accordance with the present disclosure being mounted in a carrier.

FIG. 6 shows a bracket 11 mounted in a carrier 30. The bracket 11 may be any of the brackets described above or any other bracket falling within the scope of the claims.

Figure 7:
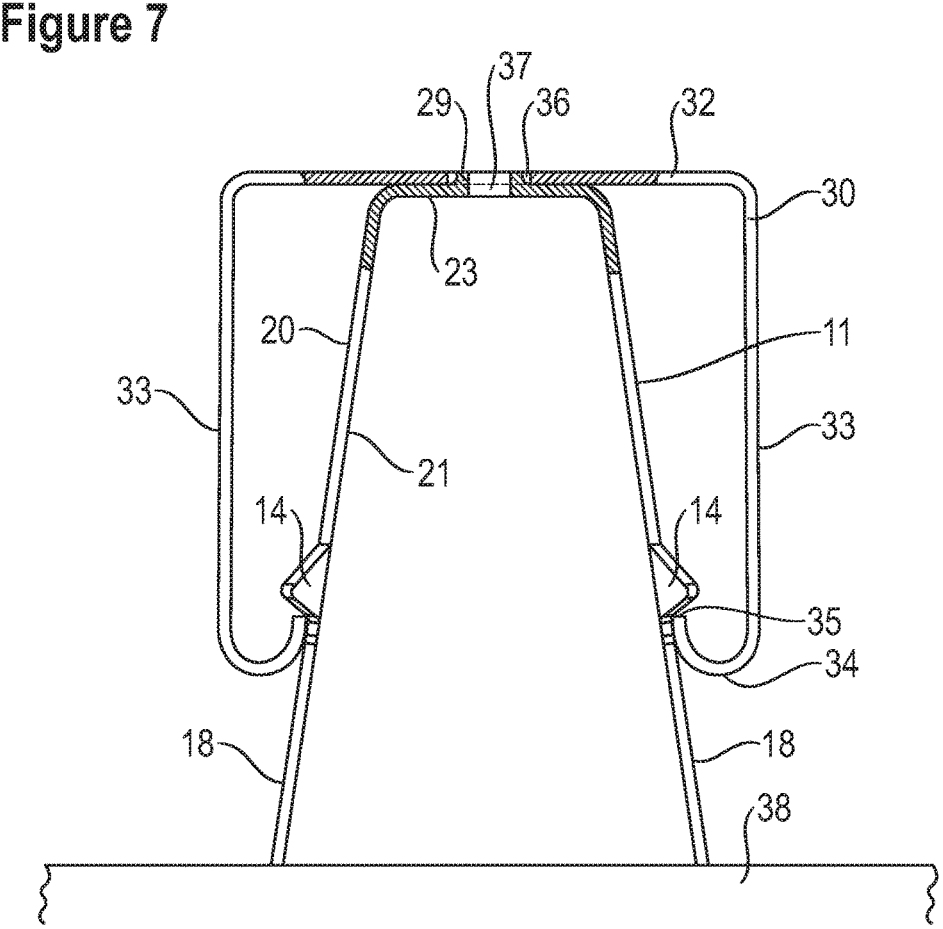
FIG. 7 shows a cross-sectional view of a bracket in accordance with the present disclosure, the bracket being installed in a carrier and a panel being mounted to the bracket.

FIG. 7 shows a bracket 11 fitted within a carrier 30. The bracket 11 is similar to that shown in FIG. 2a. The carrier 30 includes a carrier base 32 and two side walls 33 which extend in a substantially perpendicular direction away from the carrier base 32. The distal ends of the side walls of the carrier 33 are curved inwardly 34 and the tabs 14 are configured to engage with the edge 35 of a carrier side wall 33 in order to maintain the bracket 11 in position within the carrier 30. A panel 38 is mounted to the bracket 11. In this example, the carrier 30 includes holes 36 in the base of the carrier for receiving the protrusion 29. Although FIG. 7 shows the hole 36 as being a through hole, instead this may be a recess rather than a through hole. The protrusion 29 may be a solid protrusion, a hollow protrusion, or may be in the form of a through hole 37 with a surrounding rim.

FIG. 8a shows a bracket similar to that described with respect to FIG. 4a. This bracket includes tabs 27 which are configured to engage with the inside surface 31 of the side wall 33 of the carrier 30. In this example, the bracket has no protrusions 29, however, as explained above, one or more protrusions 29 might optionally be provided to engage with holes or recesses provided in the base of the carrier. The panel 38 includes bent or curved panel edges 39 which are configured to be mounted into the slots 16 of the bracket 11 as shown in FIGS. 8b and 9.

Where the panels to be mounted are linear panels, as shown in FIG. 9, and/or where the panels are of relatively small width, a bracket can be dimensioned to accommodate both panel edges 39. Panels of different widths may be accommodated by using brackets of different widths which correspond to the widths of the panels to be mounted. However, where the panel is of a substantial width, instead of providing a very wide bracket, instead two narrower brackets may be positioned along the carrier, one bracket being to receive one of the panel edges 39, and the other bracket being to receive the other panel edge 39 of the panel 38. In this case, the brackets may optionally be provided with just a single panel receiving slot 16 on each flange 18.

Although the examples show two tabs 14 being located on each of the flanges 18, a single tab 14 on each flange may instead be provided. Alternatively, more tabs than those depicted in the drawings may be provided. Furthermore, the U-shaped tab 27 may, as previously explained, instead be of square or rectangular shape, or alternatively a V or other shape. The tab 27 may also be located at a position other than a substantially central position between the side edges 13 of a flange 18. Furthermore, two or more such tabs 27 might be provided on each flange 18. Additionally, if desired, the tabs 27 may be provided in combination with the tabs 14.

The above examples describe the tabs being formed integrally with the bracket. However, the tabs may be formed from a different material to the bracket and may be secured to the bracket during manufacture of the bracket.

It can be seen that the present disclosure provides a bracket which may be inserted through the open distal part of the carrier by pressing the flanges towards each other. Upon release, the flanges will flex back to their original position, causing the tabs to engage with the side wall 33 of the carrier or/and with the longitudinal edge 35 of the side wall of the carrier, thereby installing the bracket in a desired position within the carrier. Alternatively, the tabs themselves may be made from a resilient material so that they flex inwardly during insertion of the bracket into the carrier, and snap back once they have passed the curved ends 34 of the side wall of the carrier. An advantage of the present disclosure is that the bracket may be installed in any desired position along the length of the carrier, and further may be installed by using just one hand. Where the flanges are made of a resilient material, the bracket can readily be removed and/or repositioned, simply by compressing the flanges towards each other.

Figure 10A:
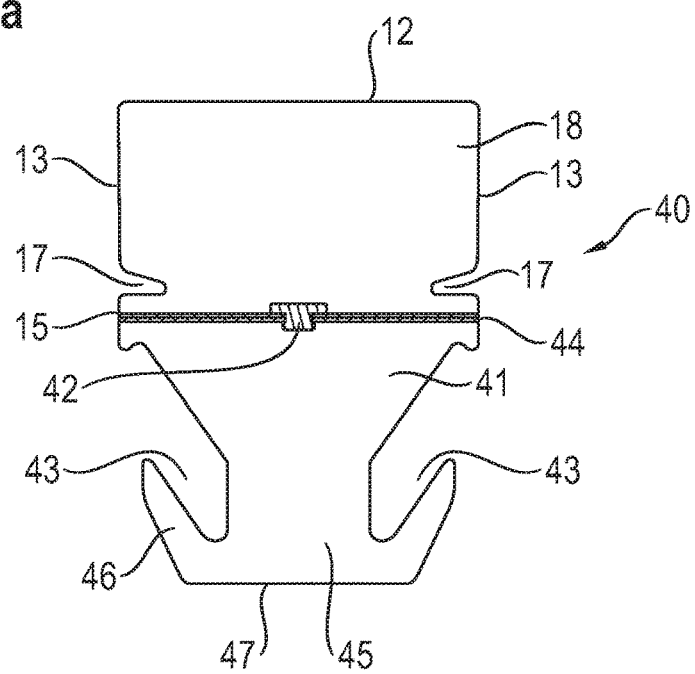
FIG. 10a shows a cut away side view of a bracket comprising a rotatable element in accordance with the present disclosure.
Figure 10B:
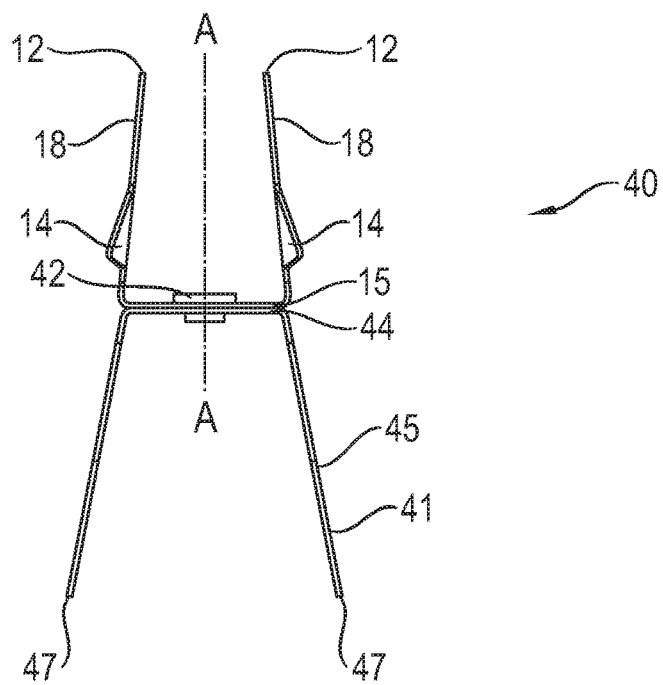
Figure 10C:
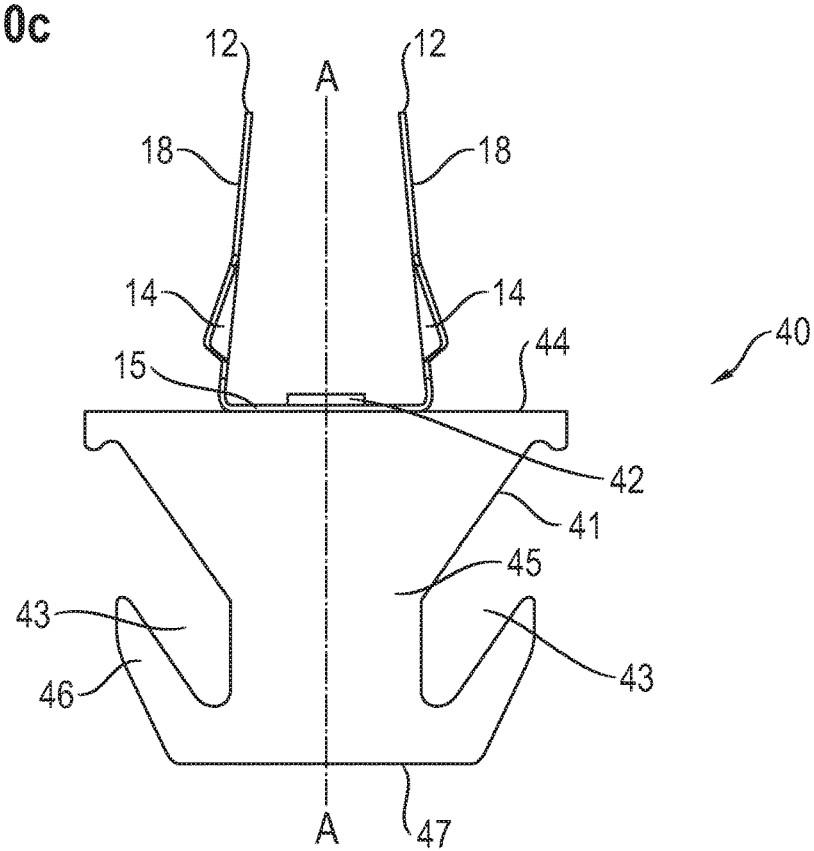
FIG. 10c shows an end view of the bracket of FIG. 10a with the rotatable element being in a different position to that shown in FIG. 10b.

FIGS. 10a-10c show a different bracket in accordance with an embodiment of the present disclosure. However, features which are common to the other brackets described in these examples have the same reference numerals for ease of understanding.

The bracket 40 of FIGS. 10a-10c comprises a base 15 and two side legs or flanges 18 which extend away from the base. The flanges terminate at distal end 12. The flanges 18 and the base 15 are preferably made out of a single piece of material, which may, for example, be a sheet metal. It is preferable that at least the flanges 18 are made from a resilient material such that, on application of a force, the flanges may be pressed inwardly, i.e. towards each other, and may then return to their original position once the force is removed. Each flange 18 has two side edges 13 which extend between the base 15 and the distal end 12 of the flange 18. Each flange 18 comprises two slots 17 which extend from the side edge 13 of the flange 18. Preferably, the slots 17 are located across from each other, one on each side edge 13 of the flange 18, and extend laterally towards each other, as can be seen in FIG. 10a. The part of the flange that extends adjacent to the slot 17 and which is located between the distal end 12 and slot 17, may then be bent in an outward direction to form an outwardly protruding tab 14 as shown in FIG. 10b. These tabs are configured to engage with the side wall of a carrier to permit the bracket 40 to be mounted in the carrier, as shown in more detail in FIGS. 12a and 12b.

The bracket 40 of this embodiment further comprises a rotatable element 41 which is rotatably coupled to the base 15 of the bracket. The rotatable element 41 may be able to rotate freely about an axis A which is perpendicular to the plane of the base 15 of the bracket. Alternatively, stops may be provided in order to limit the extent of rotation of the rotating element or to fix the rotating element in position once the desired degree of rotation has been achieved. In this embodiment, the rotatable element 41 is coupled to the base 15 of the bracket by a swivel 42, which may be, for example, a bolt and nut arrangement. This permits the rotatable element 41 to rotate relative to the base 15 of the bracket and thereby enables the bracket 40 to be held firmly in a carrier whilst the rotatable element 41 of the bracket 40 permits a panel held by the bracket 40 to be aligned at various angles with respect to the carrier.

FIGS. 10a and 10b show a cut away side view and an end view respectively of the bracket 40 when the rotatable element 41 is rotated approximately 0 degrees with respect to the base of the bracket. FIG. 10c shows a end view of the bracket 40 when the rotatable element 41 is rotated approximately 90 degrees with respect to the base 15 of the bracket 40.

The rotatable element 41 of this embodiment comprises slots 43 for receiving and holding a panel. It can be seen that, in contrast to the previous embodiments, the slots are not provided on the flanges 18 of the bracket 40 but are instead provided on the rotatable element 41.

The rotatable element 41 of this embodiment comprises a base portion 44 and two flange portions 45 extending away from the base portion 44, the base portion 44 being located between the two flange portions 45. In this embodiment, the base portion 44 of the rotatable element 41 is rotatably coupled by swivel 42 to the base 15 of the bracket 40.

In this embodiment, the distal end 47 of the flange portions and the part of a flange portion 45 adjacent to a slot 43 and located towards the distal end 47 of the flange portions have a curved shape 46 in order to facilitate the mounting of a panel in the slot 43.

The rotatable element 41 may be made from a single piece of material, which may, for example, be a sheet metal blank, such that it is formed integrally from the same material.

In an alternative embodiment, the slots 17 and tabs 14 of the bracket 40 may be replaced with an outwardly protruding flap or tab 27 similar to that shown in FIGS. 3a-3d and 4a-4d. The tab 27 may be configured to engage with the carrier in a similar manner to the tabs 14 of the bracket depicted in FIGS. 10a-10c. If desired, the edges of the tabs 14 or the tabs 27 may be sharpened for more secure engagement with the inside surface of the side wall of the carrier.

The flange portions 45 of the rotatable element may extend a short distance from the base portion 44 to their distal ends 47 where it is desired that the panel is fitted relatively close to the carrier. Where is it desired that the panels be suspended at a distance from the carrier, the flange portions 45 of the rotatable element may instead extend a considerable distance from the base portion 44 to their distal ends 47.

Figure 11:
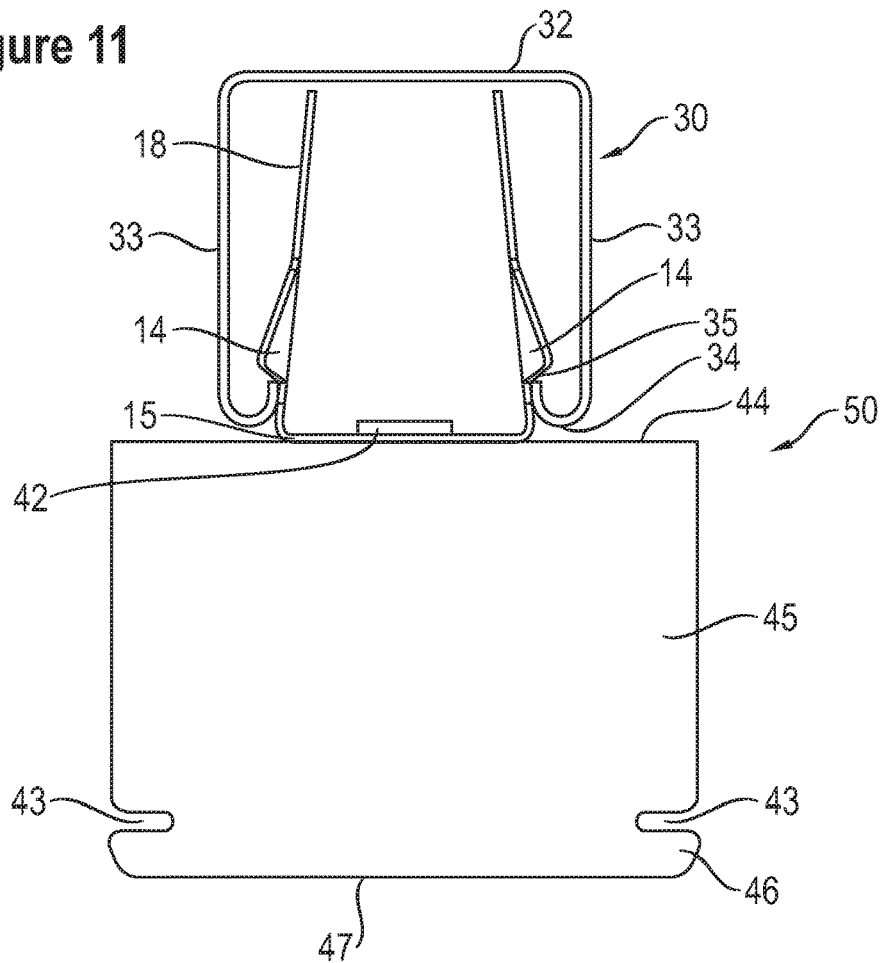
FIG. 11 shows an end view of a further bracket comprising a rotatable element in accordance with the present disclosure.

FIG. 11 shows a different bracket in accordance with further embodiment of the present disclosure. However, features which are common to the other brackets described in these examples have the same reference numerals for ease of understanding.

In FIG. 11, the bracket 50 has a rotatable element 41 which is rotated approximately 90 degrees with respect to the base 15 of the bracket 50. The bracket 50 is mounted in a carrier 30 which includes a carrier base 32 and two side walls 33 which extend in a substantially perpendicular direction away from the carrier base 32. The distal ends of the side walls of the carrier 33 are curved inwardly 34 and the tabs 14 of the bracket 50 are configured to engage with the edge 35 of a carrier side wall 33 in order to maintain the bracket 50 in position within the carrier 30. Slots 43 are provided at the distal end 47 of the flange portions 45 of the rotatable element 41 for receiving and holding a panel. The slots 43 of this embodiment have a different shape to the slots 43 of the previously described embodiment. The shape of the slots 43 may be configured in accordance with the shape of the edges of the panel to be received in the slots 43. As in the previous embodiment, the distal end 47 of the flange portions and the part of a flange portion 45 adjacent to a slot 43 and located towards the distal end 47 of the flange portions have a curved shape 46 in order to facilitate the mounting of a panel in the slot 43.

Figure 12A:
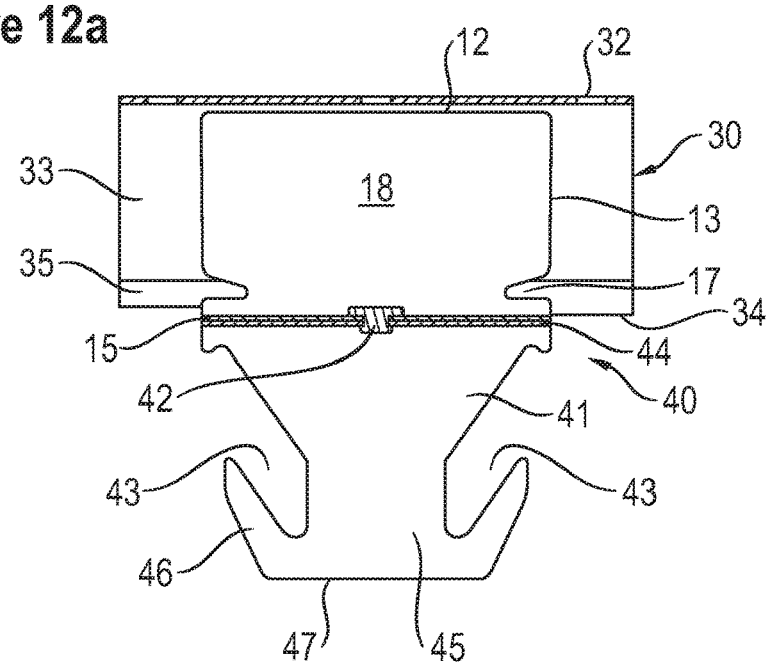
FIG. 12a shows a cut away side view of the bracket of FIG. 10a being mounted in a carrier.
Figure 12B:
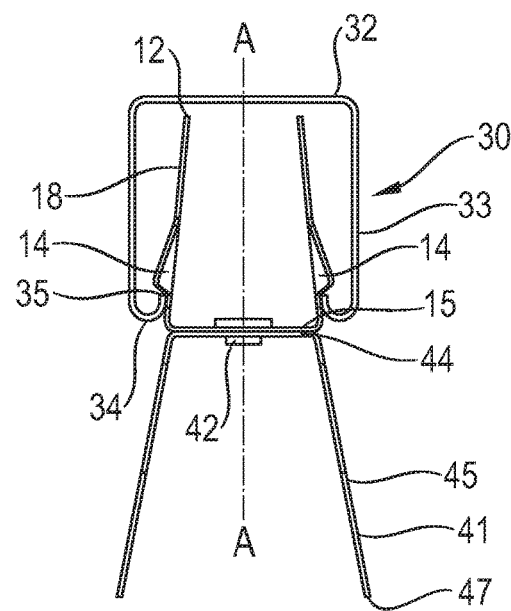
Figure 12C:
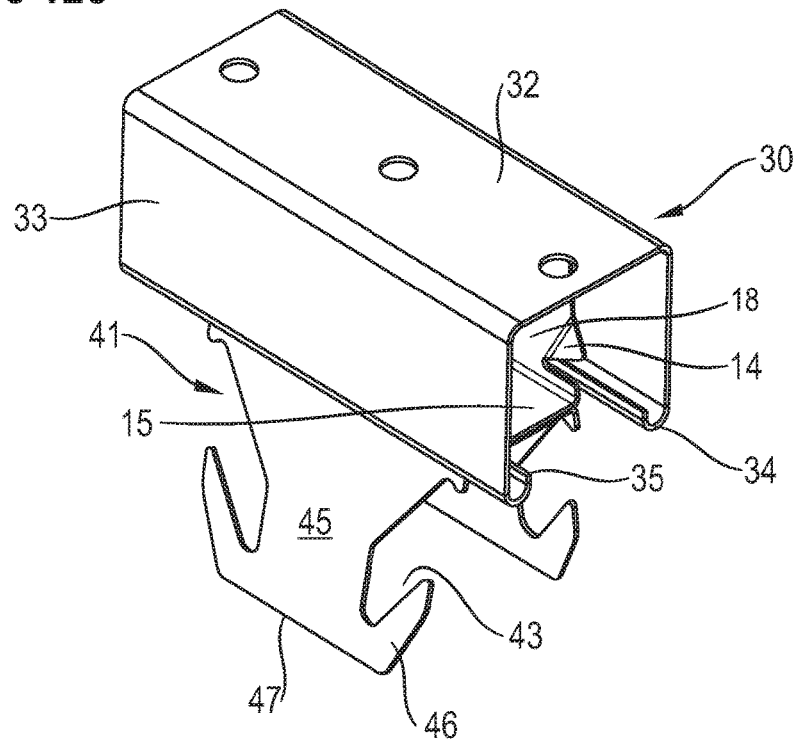

FIGS. 12a-12c show the bracket 40 of FIGS. 10a-10c mounted in carrier 30. The bracket 40 is mounted in a similar manner to the bracket 50 of FIG. 11. FIG. 12a shows a cut-away side view of the assembly, FIG. 12b shows an end view and FIG. 12c an isometric view. In FIGS. 12a-12c the rotatable element 41 of the bracket 40 is rotated approximately 0 degrees with respect to the base 15 of the bracket. Accordingly, a linear panel mounted on the bracket 40 will extend in a longitudinal direction perpendicular to the longitudinal length of the carrier 30 when the rotatable element is positioned at approximately 0 degrees of rotation with respect to the base 15 of the bracket.

Figure 13:
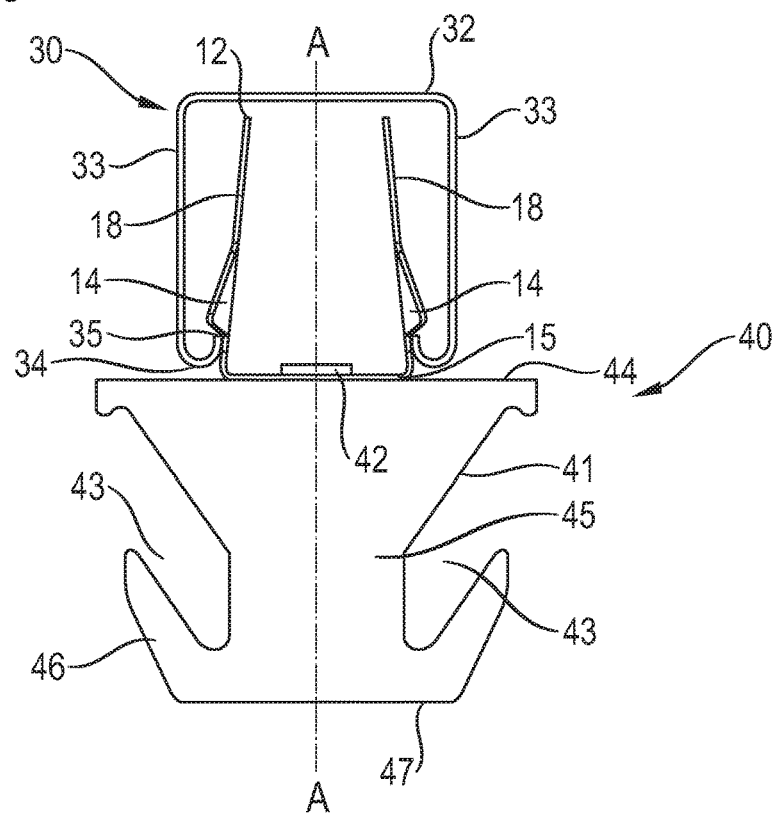
FIG. 13 shows an end view of the bracket and carrier assembly of FIG. 12b with the rotatable element being in a different position to that shown in FIG. 12b.

FIG. 13 shows the bracket 40 of FIGS. 10a-10c and 12a-12c mounted in carrier 30. FIG. 13 shows an end view of the carrier and bracket assembly similar to FIG. 12b, however in FIG. 13 the rotatable element 41 of the bracket 40 is rotated approximately 90 degrees with respect to the base 15 of the bracket, which is fixed in the carrier 30. Accordingly, in this example, linear panels mounted on the rotatable element 41 of the bracket 40 will extend in a longitudinal direction parallel to the longitudinal length of the carrier 30.

Figure 14A:
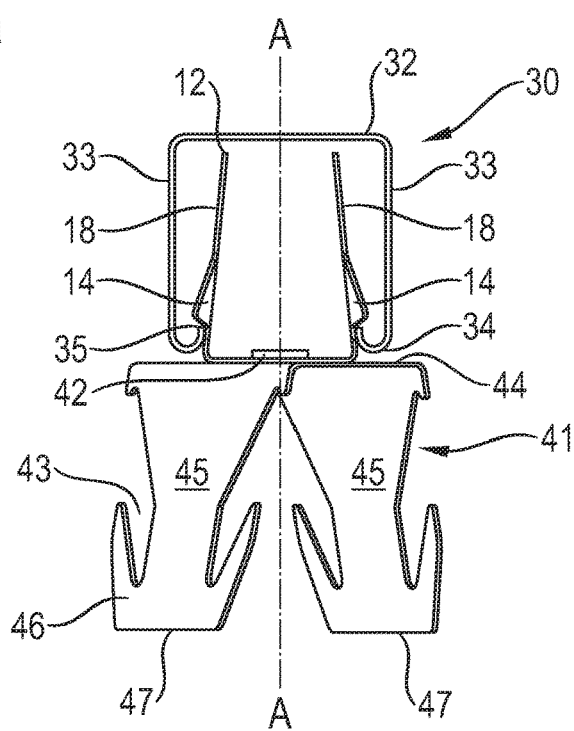
FIG. 14a shows an end view of the bracket and carrier assembly of FIG. 12b with the rotatable element being in a different position to that shown in FIG. 12b.
Figure 14B:
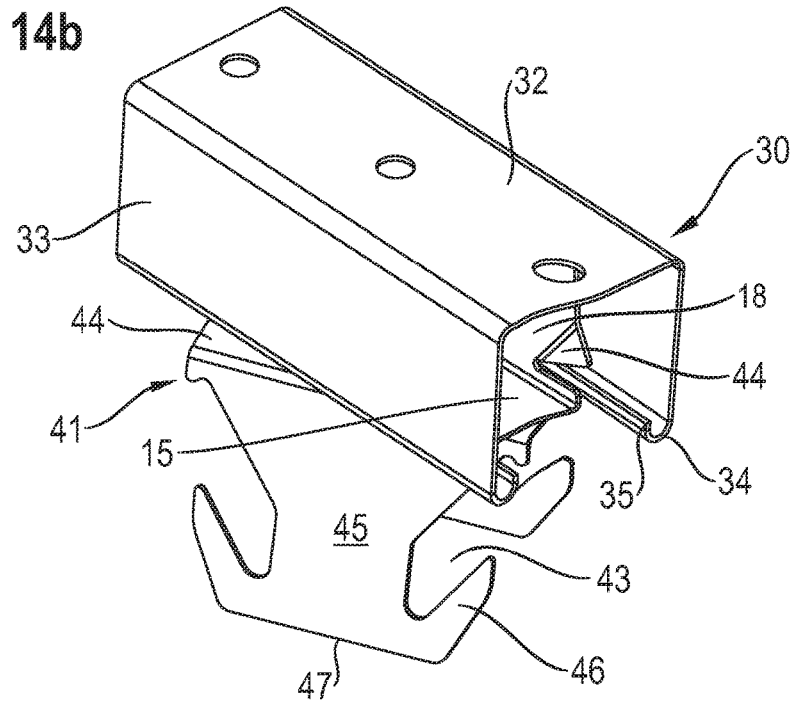

FIGS. 14a and 14b are end and isometric views respectively of the bracket 40 of FIGS. 10a-10c, 12a-12c and 13 mounted in carrier 30. In FIGS. 14a and 14b the rotatable element 41 of the bracket 40 is positioned at an angle of between 0 and 90 degrees with respect to the base 15 of the bracket, which is fixed in the carrier 30. In practice, the rotatable element 41 of the bracket 40 may be positioned at any desired angle (from 0 to 360 degrees) with respect to the base 15 thereby enabling panels to be mounted at any angle with respect to the carrier 30. This may be particularly useful for mounting elongate ceiling or wall panels.

Figure 15:
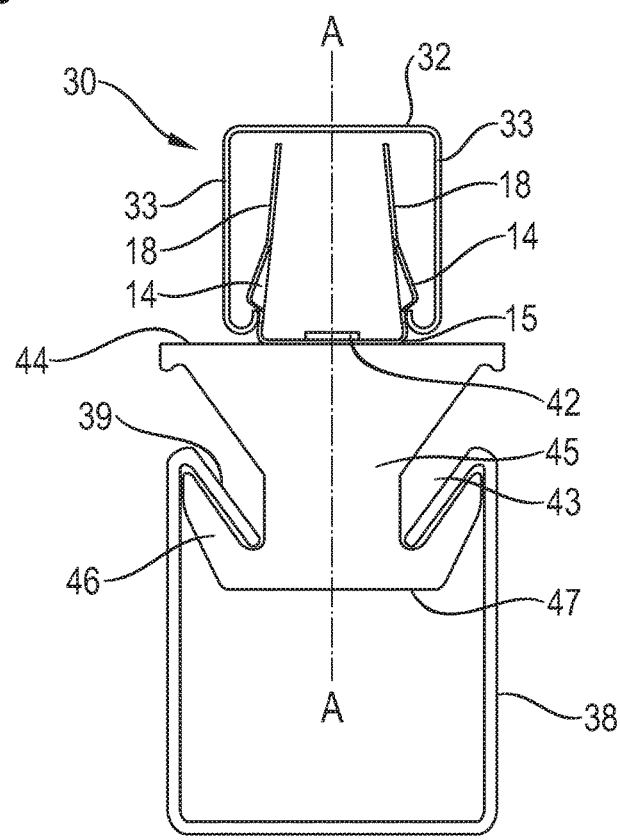
FIG. 15 shows an end view of the bracket and carrier assembly of FIG. 13 including a panel.

FIG. 15 shows the bracket 40 of FIG. 13 where the rotatable element 41 is positioned at an angle of 90 degrees relative to the base 15 of the bracket 40. The bracket 40 is fixed in the carrier, and a panel 38 is held by the bracket 40. The panel 38 has, in this example, panel edges 39 which are bent inwardly and which are received by the slots 43 of the rotatable element 41 of the bracket 40. In this example, the longitudinal direction of the panel will extend in a direction parallel to the carrier 30. As explained above, the rotatable element 41 of the bracket 40 may be rotated from 0 to 360 degrees relative to the base 15 of the bracket which is fixed with respect to the carrier 30. This enables the panel to be rotated such that the longitudinal length of the panel may extend parallel to the longitudinal length of the carrier, perpendicular to the longitudinal length of the carrier, or at any desired angle in between.

In the foregoing description, it will be appreciated that the phrases "at least one", "one or more", and "and/or", as used herein, are open-ended expressions that are both conjunctive and disjunctive in operation. The term "a" or "an" entity, as used herein, refers to one or more of that entity. As such, the terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, counterclockwise, and/or the like) are only used for identification purposes to aid the reader's understanding of the present disclosure, and/or serve to distinguish regions of the associated elements from one another, and do not limit the associated element, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

It is to be understood by one of ordinary skill in the art that the present discussion is a description of exemplary embodiments only, and is not intended as limiting the broader aspects of the present disclosure.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

The invention claimed is:

1. A carrier and bracket assembly, the assembly comprising:
a carrier including a carrier base, and first and second side walls extending away from the carrier base; and
a bracket including a base and two flanges extending away from the base, the base being located between the two flanges, each flange having an inwardly-facing surface and an outwardly-facing surface bounded by two side edges and a distal end;
wherein:
each flange comprises at least one outwardly protruding tab that engages an inner surface of one of the first side wall or the second side wall of the carrier, thereby securing the bracket to the carrier;
each flange has a pair of slots for receiving a panel; and
each slot of said pair of slots extends from a different side edge of the two side edges of the flange.

2. The assembly according to claim 1, wherein the bracket is made from a resilient material.

3. The assembly according to claim 1, wherein each flange comprises two outwardly protruding tabs, one located at each side edge of the flange.

4. The assembly according to claim 1, wherein each flange comprises a single outwardly protruding tab located substantially centrally between the side edges of the flange.

5. The assembly according to claim 1, wherein each tab has a sharp edge for allowing the tab to securely engage a portion of the one of the first side wall or the second side wall of the carrier.

6. The assembly according to claim 1, wherein each slot of said pair of slots extends from said different side edge of the flange at a location further away from the base than the at least one outwardly protruding tab.

7. The assembly according to claim 1, wherein:
each flange further comprises a second pair of slots configured to form a tab of the at least one outwardly protruding tab along each of the two side edges of the flange; and
each slot of said second pair of slots extends from a different side edge of the two side edges of the flange.

8. The assembly according to claim 1, wherein at east one of the distal end of at least one of the flanges or a part of the at least one of the flanges adjacent to a slot of the pair of slots and located towards the distal end of the at least one of the flanges has a curved shape in order to facilitate mounting of the panel in the slot.

9. The assembly according to claim 1, wherein
the first and second side walls of the carrier extend in substantially the same direction away from and substantially perpendicular to the carrier base.

10. The assembly according to claim 1, wherein each slot of said pair of slots is configured to both receive the panel and form a tab of the at least one outwardly protruding tab.

11. A mounting assembly the assembly comprising:
a carrier;
a bracket assembly coupled to the carrier, the bracket assembly comprising:
a bracket including a base and two flanges extending away from the base, the base being located between the two flanges, each flange comprises at least one outwardly protruding tab that engages a portion of the carrier, thereby securing the bracket to the carrier; and
a rotatable element rotatably coupled to the base of the bracket such that the rotatable element is configured to rotate relative to the bracket about an axis, the axis being perpendicular to a plane defined by the base of the bracket; and
a panel suspended relative to the carrier via the rotatable element of the bracket assembly such that the panel is configured to be rotated about the axis to adjust an orientation of the panel relative to the carrier.

12. The assembly according to claim 11, wherein the rotatable element is coupled by a swivel to the base of the bracket.

13. The assembly according to claim 11, wherein:
the rotatable element comprises one or more slots; and
a portion of the panel is received within the one or more slots to couple the panel to the rotatable element.

14. The assembly according to claim 13, wherein:
the rotatable element has a base portion and two flange portions extending away from the base portion;
the base portion of the rotatable element is located between the two flange portions of the rotatable element;
the base portion of the rotatable element is rotatably coupled to the base of the bracket; and
each flange portion of the rotatable element comprises at least one slot that receives a portion of the panel when the panel is coupled to the rotatable element.

15. A canter and bracket assembly, the assembly comprising:
a carrier including a carrier base, and first and second side walls extending away from the carrier base, a distal end of each of the first and second side walls being curved inwardly; and
a bracket including a base and two flanges extending away from the base, the base being located between the two flanges, each flange having an inwardly-facing surface and an outwardly-facing surface bounded by two side edges and a distal end;
wherein:
each flange comprises at least one outwardly protruding tab that either engages an inner surface of one of the first and second side walls of the carrier or engages an edge of one of the first and second side walls of the carrier, thereby securing the bracket to the carrier;
each flange has a pair of slots for receiving a panel; and
each slot of said pair of slots extends from a different side edge of the two side edges of the flange.

16. The assembly of claim 15, wherein the at least one outwardly protruding tab engages the edge defined at the curved distal end of the one of the first and second side walls of the carrier.

17. The assembly of claim 15, wherein the at least one outwardly protruding tab engages the inner surface of the one of the first and second side walls of the carrier at a location between the carrier base of the carrier and the distal end of the one of the first and second sidewalls.

18. The assembly of claim 15, wherein:
the base of the bracket includes at least one protrusion extending outwardly therefrom; and
the at least one protrusion is configured to be received within a portion of the carrier base of the carrier.

19. The assembly according to claim 15 wherein
the first and second side walls of the carrier extend in substantially the same direction away from and substantially perpendicular to the carrier base.

20. A carrier, bracket, and panel assembly, the assembly comprising:

a carrier;

a bracket installed within the carrier, the bracket including a base and two flanges extending away from the base, the base being located between the two flanges, each flange having an inwardly-facing surface and an outwardly-facing surface bounded by two side edges and a distal end; and a linear panel mounted to the bracket, the linear panel including bent or curved edges;

wherein:

each flange comprises at least one outwardly protruding tab that engages the carrier, thereby securing the bracket to the carrier;

each flange has a pair of slots, with each slot of said pair of slots extending from a different side edge of the two side edges of the flange; and each edge of the bent or curved edges of the linear panel is received within a respective slot the pair of slots.

21. The assembly of claim 20, wherein:

the carrier includes a carrier base and first and second side walls extending outwardly from the carrier base to a respective distal end of each of the first and second side walls;

the at least one outwardly protruding tab engages an inner surface of the carrier at a location between the carrier base and the distal end of one of the first side wall or the second side wall.

22. The assembly of claim 20, wherein:

the carrier includes a carrier base and first and second side walls extending outwardly from the carrier base to a respective distal end of each of the first and second side walls;

the distal end of each of the first and second side walls is curved inwardly; and the at least one outwardly protruding tab engages the curved distal end of one of the first and second side walls of the carrier.

23. The assembly of claim 20, wherein:

the carrier includes a carrier base and first and second side walls extending outwardly from the carrier base; and the base of the bracket is configured to be positioned directly adjacent to the carrier base when the bracket is installed within the carrier.

24. The assembly of claim 20, wherein:

the base of the bracket includes at east one protrusion extending outwardly therefrom; and the at least one protrusion is configured to be received within a portion of the carrier base of the carrier.

* * * * *